United States Patent Office 3,227,613
Patented Jan. 4, 1966

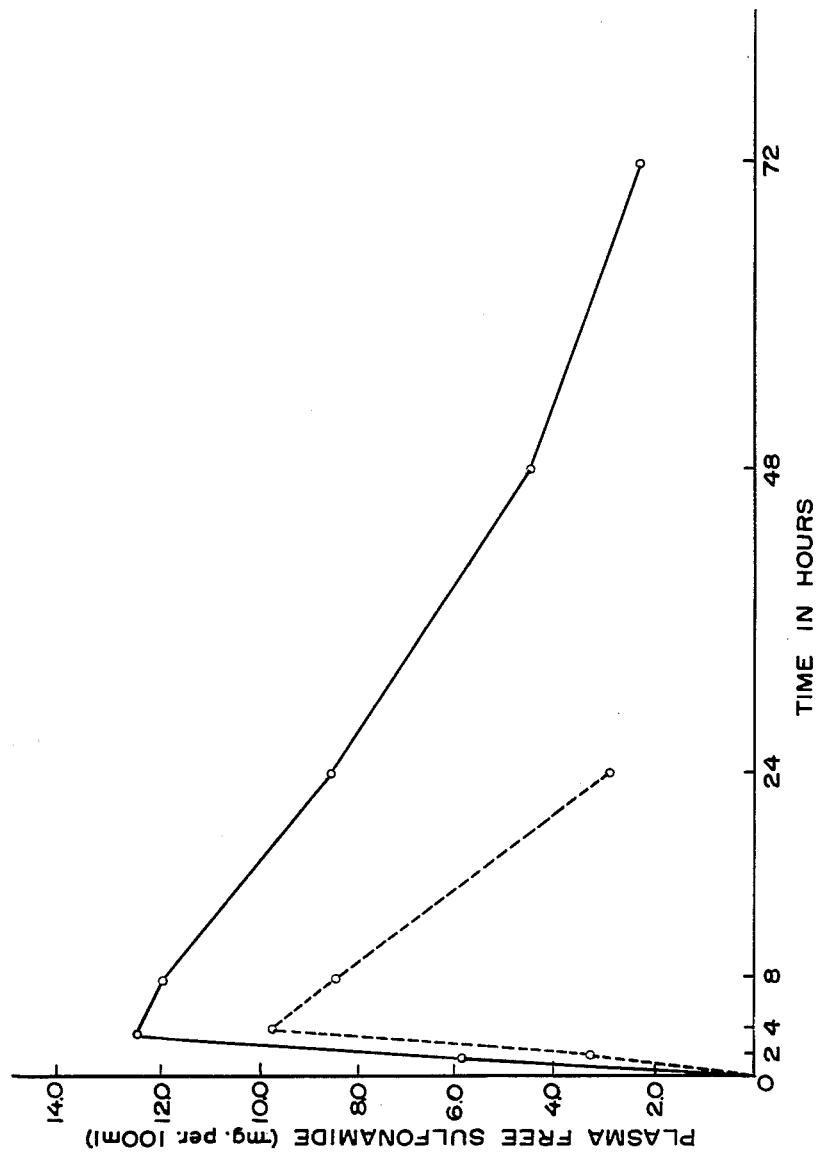

3,227,613
METHOD OF PRODUCING PROLONGED SULFONAMIDE LEVEL IN BLOOD
Hideo Kano, Kyoto-shi, Masaru Ogata, Kobe-shi, and Haruo Nishimura, Ashiya-shi, Japan, assignors to Shionogi & Co., Ltd., Fukushima-ku, Osaka, Japan
Original application Dec. 6, 1962, Ser. No. 242,862, now Patent No. 3,144,448, dated Aug. 11, 1964. Divided and this application Apr. 24, 1963, Ser. No. 279,352
Claims priority, application Japan, Aug. 21, 1962, 37/36,028, 37/36,029, 37/36,030
4 Claims. (Cl. 167—51.5)

The present application is a division of copending application, Serial No. 242,862, filed December 6, 1962 (and now Patent No. 3,144,448).

The present invention relates to the production of high and prolonged sulfonamide level in blood in vivo with the aid of halogenated isoxazole derivatives of sulfanilamide. More particularly, this is realized by means of 3-sulfanilamido-4-halogeno-5-alkylisoxazoles.

The said halogenated isoxazole derivatives of sulfanilamide are representable by the formula:

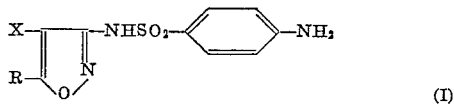

wherein R is lower alkyl (e.g. methyl, ethyl, propyl, butyl) and X is halogen (e.g. chlorine, bromine, iodine).

These halogenated isoxazole derivatives of sulfanilamide of Formula I show high antibacterial activity with low toxicity, characteristically, in vivo. They also show high and prolonged sulfonamide level in blood in vivo.

The 3 - sulfanilamido - 4 - halogeno-5-alkylisoxazole of Formula I can be prepared by the interaction of 3-amino-4-halogeno-5-alkylisoxazole representable by the formula:

wherein R and X each has the same significance as designated above, with a p-substituted benzenesulfonic acid derivative representable by the formula:

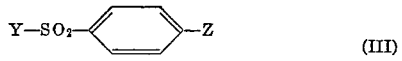

wherein Y is the reactive group of a reactive p-substituted benzenesulfonic acid derivative and Z is a group, such as acylamino, nitro and azo, which is convertible to an amino group, followed by the conversion of the p-substituent of the resulting compound into the amino group.

The one starting material, namely 3-amino-4-halogeno-5-alkylisoxazole of Formula II, can be prepared by the treatment of 3-amino-5-alkylisoxazole with a halogenating agent according to the following scheme:

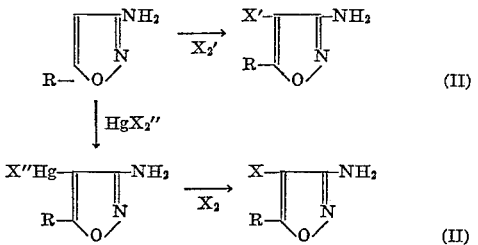

wherein R and X each has the same significance as designated above, X' is chlorine or bromine and X" is halogen (e.g. chlorine, bromine, iodine). Thus, 3-amino-5-alkyl-isoxazole may be reacted with chlorine or bromine, preferably in an inert organic solvent (e.g. methanol, ethanol, acetic acid, chloroform, carbon tetrachloride, trichloroethane), while cooling with water or ice, to give 3-amino-4-chloro- or -bromo-5-alkylisoxazole. Alternatively, 3-amino-5-alkylisoxazole may be reacted with mercuric halide (e.g. mercuric chloride, mercuric bromide, mercuric iodide) in a hydrous medium (e.g. water, water-methanol, water-ethanol, water-acetic acid), preferably while refluxing, followed by the treatment of the resulting 3-amino-4-halogenomercuri-5-alkylisoxazole with a mixture of halogen (e.g. chlorine, bromine, iodine) and its alkali metal salt (e.g. potassium chloride, potassium bromide, potassium iodide) in a hydrous medium (e.g. water, water-methanol, water-ethanol, water-acetic acid) at room temperature (e.g. about 20° to about 30° C.) or while heating, to give 3-amino-4-halogeno-5-alkylisoxazole. These fundamental procedures may be also carried out with appropriate previous and/or subsequent treatments which are per se not part of the present invention. In the former procedure for instance, 3-amino-5-alkylisoxazole may be previously acylated and then subjected to halogenation, followed by deacylation of the acylamino group at the 3-position of the resulting intermediate whereby 3-amino-4-halogeno-5-alkylisoxazole is produced. As specific examples of 3-amino-4-halogeno-5-alkylisoxazole, there may be included 3-amino-4-chloro-5-methylisoxazole, 3-amino-4-bromo-5-methylisoxazole, 3-amino-4-iodo-5-methylisoxazole, 3-amino-4-chloro-5-ethylisoxazole, 3-amino-4-iodo-5-ethylisoxazole, 3-amino-4-chloro-5-n-propylisoxazole, 3-amino-4-bromo-5-n-propyl-isoxazole, 3-amino-4-iodo-5-iso-propylisoxazole, 3-amino-4-chloro-5-n-butylisoxazole and the like.

The other starting material, namely the p-substituted benzenesulfonic acid derivative of Formula III, is usually employed in the preparation of sulfonamides. There may be generically exemplified p-acylaminobenzenesulfonic acid, p-nitrobenzenesulfonic acid, azobenzene-p,p'-disulfonic acid, p-acylaminobenzenesulfonic ester, p-nitrobenzenesulfonic ester, azobenzene-p,p'-disulfonic ester, p-acylaminobenzenesulfonyl halide, p-nitrobenzenesulfonyl halide, azobenzene-p,p'-disulfonyl halide and the like. The acyl group may not only be alkanoyl (e.g. acetyl, propionyl, butyryl), aryloyl (e.g. benzoyl, toluoyl, xyloyl) and aralkanyol (e.g. phenylacetyl, phenylpropionyl) but also alkoxycarbonyl (e.g. ethoxycarbonyl, propoxycarbonyl), aryloxycarbonyl (e.g. phenoxycarbonyl, tolyloxycarbonyl) and aralkoxycarbonyl (e.g. benzyloxycarbonyl, phenethyloxycarbonyl), although the latter three are sometimes not included in the category of "acyl." Further, the ester may be an alkyl ester (e.g. methyl ester, ethyl ester, propyl ester), aryl ester (e.g. phenyl ester) and aralkyl ester (e.g. benzyl ester, phenethyl ester), inclusively.

The following p-substituted benzenesulfonic acid derivatives may be given by way of specific exemplification:

p-acetylaminobenzenesulfonic acid,
p-propionylaminobenzenesulfonic acid,
p-benzoylaminobenzenesulfonic acid,
p-ethoxycarbonylaminobenzenesulfonic acid,
p-benzyloxycarbonylaminobenzenesulfonic acid,
p-nitrobenzenesulfonic acid,
methyl p-acetylaminobenzenesulfonate,
ethyl p-acetylaminobenzenesulfonate,
benzyl p-acetylaminobenzenesulfonate,
ethyl p-nitrobenzenesulfonate,
ethyl azobenzene-p,p'-disulfonate,
phenyl azobenzene-p,p'-disulfonate,
o-acetylaminobenzenesulfonyl chloride,
p-acetylaminobenzenesulfonyl bromide,
p-propionylaminobenzenesulfonyl chloride, p-benzoylaminobenzenesulfonyl chloride,
p-ethoxycarbonylaminobenzenesulfonyl chloride,
p-phenoxycarbonylaminobenzenesulfonyl bromide,
o-benzyloxycarbonylaminobenzenesulfonyl chloride,
p-nitrobenzenesulfonyl chloride,
azobenzene-p,p′-disulfonyl chloride,
azobenzene-p,p′-disulfonyl bromide, etc.

Of these p-substituted benzenesulfonic acid derivatives, p-alkanoylaminobenzenesulfonyl halide may be used with greatest advantage in view of its excellent reactivity.

The said two starting materials are firstly subjected to condensation. The reaction can be executed by treating a 3-amino-4-halogen-5-alkylisoxazole of Formula II with a p-substituted benzenesulfonic acid derivative of Formula III in an inert solvent. The inert solvent is required to be able to dissolve at least one of the starting materials and may be generally selected from lower alkanols (e.g. methanol, ethanol), lower aliphatic ketones (e.g. acetone, methyl ethyl ketone), aromatic hydrocarbons (e.g. benzene, toluene), aliphatic esters (e.g. methyl acetate, ethyl acetate), ethers (e.g. diethyl ether), cyclic ethers (e.g. dioxane, tetrahydrofuran), halogenalkanes, (e.g. chloroform, dichloroethane, carbon tetrachloride) and the like. When a p-substituted benzenesulfonyl halide is used as the starting material, the condensation is a kind of deacidation reaction, and the presence of a basic substance is preferred. As the basic substance, there may be employed organic bases such as pyridine bases (e.g. pyridine, picoline, lutidine, collidine) and trialkylamines (e.g. triethylamine) or inorganic bases such as alkali metal carbonates (e.g. sodium carbonate, potassium carbonate) and alkaline earth metal carbonates (e.g. calcium carbonate, barium carbonate). These basic substances may be used in the form of mixture, suspension or solution in the said inert organic solvent or, in the case of liquid, alone. The reaction temperature may be correlated to the starting materials and/or the reaction medium.

As the result of the condensation, there is obtained 3-(p-substituted benzenesulfonylamino) - 4 - halogeno - 5 - alkylisoxazole representable by the formula:

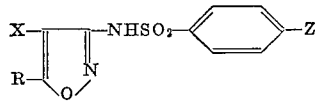

(IV)

wherein R, X and Z each has the same significance as designated above.

The thus-prepared 3 - (p-substituted benzenesulfonylamino)-4-halogeno-5-alkylisoxazole of Formula IV is next subjected to the conversion of the p-substituent on the benzene ring into an amino group. The conversion procedure to be applied may be correlated to the said p-substituent. When the p-substituent is an acylamino group, the conversion can be effected by hydrolysis. The hydrolysis reaction may be carried out in per se conventional manner, i.e. heating with acid or alkali. When the p-substituent is a nitro group, there is adopted a reduction procedure which is usually employed for the conversion of the nitro group on an aromatic ring into an amino group. For instance, there may be employed the reduction using a reducing agent such as metal-acid, metal-alkanol and metal-liquid ammonia, catalytic reduction and electrolytic reduction. The method wherein the reduction is carried out using a combination of a metal (e.g. zinc, tin) with an acid (e.g. hydrochloric acid, acetic acid, glacial acetic acid containing hydrogen chloride) at room temperature or while heating is particularly preferred from the economical viewpoint. The catalytic reduction using nickel catalyst, palladium catalyst or platinum catalyst is also preferred from the standpoint of easy operation and rare side-reaction. When the p-substituent is an azo group, the 3-(p-substituted benzenesulfonylamino)- 4-halogeno-5-alkylisoxazole of Formula IV can be written more clearly as follows:

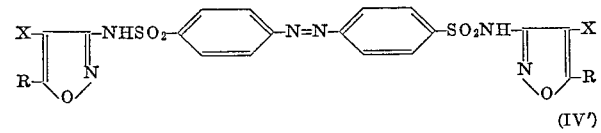

(IV′)

wherein R and X each has the same significance as designated above. In this case, the conversion may be accomplished by reduction. For instance, there may be employed the reduction using a reducing agent such as stannous chloride-hydrochloric acid and alkali metal dithionite, catalytic reduction and electrolytic reduction. The catalytic reduction using Raney nickel in an aqueous solution of alkali hydroxide or platinum oxide in dioxane is particularly preferred.

The product of the present invention is 3-sulfanilamido-4-halogeno-5-alkylisoxazole of Formula I, which includes specifically the following compounds: 3-sulfanilamido-4-chloro - 5 - methylisoxazole, 3-sulfanilamido-4-bromo-5-methylisoxazole, 3 - sulfanilamido-4-iodo-5-methylisoxazole, 3-sulfanilamido-4-chloro-5-ethylisoxazole, 3-sulfanilamido - 4-bromo-5-ethylisoxazole, 3-sulfanilamido-4-iodo- 5 - ethylisoxazole, 3 - sulfanilamido-4-chloro-5-n-propylisoxazole, 3-sulfanilamido-4-bromo-5-iso-propylisoxazole, 3 - sulfanilamido - 4-iodo-5-n-propylisoxazole, 3-sulfanilamido - 4 - bromo-5-n-butylisoxazole, 3-sulfanilamido-4-iodo-5-n-butylisoxazole, etc.

These 3-sulfanilamido-4-halogeno-5-alkylisoxazoles of Formula I are useful as antibacterial agents in combatting infections of pathogenic bacteria. Especially, 3-sulfanilamido-4-iodo-5-methylisoxazole is the presently-preferred one; its animal and clinical test data are set forth in the following tables, compared with the sulfonamide, 3-sulfanilamido-5-methylisoxazole (U.S. Patent No. 2,888,455).

The in vitro antibacterial spectra of the sulfonamides were determined by an agar streak dilution method. Serial two-fold dilutions of the sulfonamide were prepared in synthetic medium and the surface of the agar was streaked with suitable dilution of young broth cultures. The lowest concentration of sulfonamide which prevented visible growth after 24 hours of incubation at 37° C. was designated as the minimal inhibitory concentration. The results are shown in Table I.

TABLE I.—ANTIBACTERIAL SPECTRA (IN VITRO)

| Test Organisms | Minimum Inhibitory Concentration (mcg. per ml.) | |
| --- | --- | --- |
| | 3-Sulfanilamido-4-iodo-5-methylisoxazole | 3-Sulfanilamido-5-methylisoxazole |
| Shigella paradysenteriae, Komagome B¹ | 1.0 | 0.5 |
| Shigella paradysenteriae, kawase | 1.0 | 0.5 |
| Shigella paradysenteriae, Ohara | 2.0 | 1.0 |
| Salmonella paratyphi A | 16.0 | 8.0 |
| Salmonella paratyphi B | 16.0 | 8.0 |
| Salmonella paratyphi C | 4.0 | 2.0 |
| Salmonella typhi murium | 8.0 | 4.0 |
| Escherichia coli communis | 16.0 | 8.0 |
| Klebsiella pneumoniae | 8.0 | 4.0 |
| Bacillus subtilis, PCI-219 | 32.0 | 4.0 |

From this table, it is seen that in vitro antibacterial spectrum of 3-sulfanilamido-4-iodo-5-methylisoxazole is quite identical with that of 3-sulfanilamido-5-methylisoxazole, although there is a slight difference in activity.

To determine the in vivo activity of sulfonamides, infections with Diplococcus pneumoniae and Klebsiella pneumoniae were produced in mice, in groups of 10 mice, by intraperitoneal injections of the bacteria using 100 MLD (minimum lethal dose) of the bacterial cultures. The mice were treated 3, 24, 48, 72 and 96 hours after infection. The sulfonamide, emulsified with gum arabic, was administered orally to the groups of mice, and survival of infected mice was recorded up to 10 days after infection, at which time the tests were terminated. The percentage deaths were plotted against logarithmic dose on logarithmic probability scale paper and the dose of sulfonamide (mg./kg.) giving protection to 50% of the mice was read off from the graph. The results are shown in Table II.

TABLE II.—ANTIBACTERIAL ACTIVITY (IN VIVO)

(a) *DIPLOCOCCUS PNEUMONIAE*, TYPE 1

| Sulfonamides | Dosage (mg./kg./day) | No. Alive/ No. Tested | Percent Effect | Median Effective Dose (ED$_{50}$), mg./kg.) |
|---|---|---|---|---|
| 3-Sulfanilamido-4-iodo-5-methyl-isoxazole. | 500 | 3/10 | 30 | 780 |
|  | 750 | 4/10 | 40 |  |
|  | 1,000 | 7/10 | 70 |  |
| 3-Sulfanilamido-5-methyl-isoxazole. | 500 | 1/10 | 10 | 920 |
|  | 750 | 3/10 | 30 |  |
|  | 1,000 | 6/10 | 60 |  |

(b) *KLEBSIELLA PNEUMONIAE*

| 3-Sulfanilamido-4-iodo-5-methyl-isoxazole. | 250 | 1/10 | 10 | 540 |
|---|---|---|---|---|
|  | 500 | 5/10 | 50 |  |
|  | 750 | 9/10 | 90 |  |
|  | 1,000 | 10/10 | 100 |  |
| 3-Sulfanilamido-5-methyl-isoxazole. | 250 | 0/10 | 0 | 650 |
|  | 500 | 3/10 | 30 |  |
|  | 750 | 6/10 | 60 |  |
|  | 1,000 | 9/10 | 90 |  |

From the above table, it can be pointed out that 3-sulfanilamido-4-iodo-5-methylisoxazole is more effective than 3-sulfanilamido-5-methylisoxazole against pneumococcal and Klebsiella infections.

In order to ascertain the absorption of the sulfonamides in human beings, the sulfonamides were orally administered to human subjects at a dose of 2 grams, and citrated venous samples of blood were obtained before and at various intervals after administration. The blood specimens were centrifuged within 30 minutes of drawing, and plasma harvested into sterile test tubes. The thus-obtained plasma samples were analyzed for free sulfonamide by the Tsuda method [Yakugaku (Science of Drugs), vol. 2, 12 (1948)]. The averages of free values of both sulfonamides obtained at the various intervals are shown graphically in the accompanying figure of drawings. The solid line represents average free-3-sulfanilamido-4-iodo-5-methylisoxazole plasma level and the broken line shows average free 3-sulfanilamido-5-methylisoxazole plasma level.

From the said figure, it can be seen that 3-sulfanilamido-4-iodo-5-methylisoxazole and 3-sulfanilamido-5-methylisoxazole are rapidly absorbed and reach identical maximum plasma peaks, 4 hours after administration, but the former shows a higher maximum peak value with a slower drop in concentration than the latter. It is, therefore, clear than 3-sulfanilamido-4-iodo-5-methylisoxazole shows far better maintenance of plasma levels than does 3-sulfanilamido-5-methylisoxazole.

To determine the acute toxicity, the sulfonamides were emulsified with gum arabic and administered orally to mice. The animals were observed for 7 days and deaths were recorded each day. The median lethal dose (LD$_{50}$) was determined graphically by plotting the dilution factor of the dose against the percentage deaths, using logarithmic probability scale paper. The results are shown in Table III.

TABLE III.—ACUTE TOXICITY (PER OS. IN MICE)

Sulfonamides:  Median lethal dose (LD$_{50}$) (mg./kg.)
   3-Sulfanilamido-4-iodo-5-methylisoxazole _____ 4,500
   3-Sulfanilamido-5-methyl-isoxazole _____ 2,500

From this table, it is clear than 3-sulfanilamido-4-iodo-5-methylisoxazole is remarkably less toxic than 3-sulfanilamido-5-methylisoxazole.

Making a summary of the above results, it can be said that 3-sulfanilamido-4-iodo-5-methylisoxazole is useful as a long-acting sulfonamide which exhibits a high antibacterial activity especially in vivo. It may be also said that the sulfonamide is employed for producing a high and prolonged sulfonamide level in blood in view of its excellent absorption and low toxicity. The other 3-sulfanilamido-4-halogen-5-alkylisoxazoles of Formula I also have similar activities.

The 3-sulfanilamido-4-halogeno-5-alkylisoxazoles of the present invention can be prepared and administered to living bodies such as animals and human beings in a wide variety of oral and parenteral dosage forms, singly or in a mixture with other coacting compounds. They can be associated with a carrier which can be a solid material or liquid, in which the sulfonamides are dissolved, dispersed or suspended. The solid composition can take the form of tablets, powders, capsules or the like preferably in unit dosage forms for simple administration or precise dosages. Prior to the preparation, conventional changes may be made on the sulfonamides. In a per se conventional manner, for instance, the sulfonamides may be converted into the alkali metal—e.g. sodium—salts thereof, which are suitable for liquid form preparations, such as those for injection. However, the administration of these derivatives to living bodies for the production of high and prolonged sulfonamide level in blood is intended to be within the scope of the present invention, because it is substantially equal to the administration of the sulfonamides per se.

The following examples represent presently-preferred embodiments of the present invention, but it is to be understood that the examples are given by way of illustration only and not of limitation. The relationship of parts by weight to parts by volume is the same as that between grams and milliliters. Temperatures are set forth in degrees centigrade.

*Example 1.—3-amino-4-chloro-5-methylisoxazole*

Into a solution of 3-amino-5-methylisoxazole (1 part by weight) in glacial acetic acid (5 parts by volume), chlorine gas is bubbled while cooling with water. After 30 minutes, an aqueous solution of sodium bisulfite is added to the reaction mixture, which is then shaken with chloroform. The chloroform layer is washed with water to remove acetic acid, and dried. After removal of the solvent, the residue is crystallized from cyclohexane to give 3-amino-4-chloro-5-methylisoxazole (0.7 part by weight) as silky threadlike colorless needles melting at 89 to 91° C.

*Analysis.*—Calcd. for $C_4H_5ON_2Cl$: C, 36.10; H, 3.77; N, 21.05. Found: C, 36.55; H, 4.30; N, 20.76.

*Example 2.—3-amino-4-bromo-5-methylisoxazole*

To a solution of 3-amino-5-methylisoxazole (1 part by weight) in glacial acetic acid (5 parts by volume), there is added dropwise bromine (1.6 parts by weight) while cooling with water. After 30 minutes, an aqueous solution of sodium bisulfite is added to the reaction mixture, which is then shaken with chloroform. The chloroform layer is washed with water and dried. After removal of the solvent, the residue is crystallized from cyclohexane to give 3-amino-4-bromo-5-methylisoxazole (0.7 part by weight) as colorless needles melting at 77 to 78° C.

*Analysis.*—Calcd. for $C_4H_5ON_2Br$: C, 27.12; H, 2.82; N, 15.82. Found: C, 27.55; H, 2.86; N, 15.74.

*Example 3.—3-amino-4-chloro-5-methylisoxazole*

3-acetylamino-5-methylisoxazole prepared from 3-amino-5-methylisoxazole (1 part by weight) by a conventional acetylation procedure is subjected to chlorination as shown in Example 1. The resulting 3-acetylamino-4-chloro-5-methylisoxazole is hydrolyzed with an aqueous solution of sodium hydroxide to give 3-amino-4-chloro-5-methylisoxazole (0.8 part by weight).

*Example 4.—3-amino-4-iodo-5-methylisoxazole*

A solution of 3-amino-5-methylisoxazole (1.5 parts by weight) in a small amount of water and a solution of mercuric chloride (9 parts by weight) in hot water (200 parts by volume) are combined together. The resultant mixture is refluxed for about 1 hour and then cooled. The precipitate is collected by filtration whereby 3-amino-4-chloromercuri-5-methylisoxazole (4.5 parts by weight) is obtained as white crystals melting at 223° C. (decomp.). The 3-amino-4-chloromercuri-5-methylisoxazole (3.5 parts by weight) is mixed with a solution of iodine (2.7 parts by weight) and potassium iodide (8 parts by weight) in water (50 parts by volume) and stirred for 30 minutes. To the reaction mixture, there is added sodium bisulfite to decolorize the color caused by excess of iodine. The resulting mixture is shaken with chloroform and the chloroform layer is dried. After removal of the solvent, the residue is crystallized from water to give 3-amino-4-iodo-5-methylisoxazole (0.8 part by weight) as colorless prisms melting at 104 to 104.5° C.

*Analysis.*—Calcd. for $C_4H_5ON_2I$: C, 21.44; H, 2.25; N, 12.50. Found: C, 21.67; H, 2.17; N, 12.73.

*Example 5.—3-amino-4-bromo-5-methylisoxazole*

A solution of 3-amino-5-methylisoxazole (1.5 parts by weight) in a small amount of water and a solution of mercuric chloride (9 parts by weight) in hot water (200 parts by volume) are combined together. The resulting mixture is refluxed for about 1 hour and then cooled. The precipitate is collected by filtration whereby 3-amino-4-chloromercuri-5-methylisoxazole (4.5 parts by weight) is obtained. The 3-amino-4-chloromercuri-5-methylisoxazole (3.5 parts by weight) is mixed with a solution of bromine (1.7 parts by weight) and potassum bromide (5.8 parts by weight) in water (50 parts by volume) and stirred for 30 minutes. To the reaction mixture, there is added sodium bisulfite to decolorize the color caused by excess of bromine. The resulting mixture is shaken with chloroform and the chloroform layer is dried. After removal of the solvent, the residue is crystallized from hexane to give 3-amino-4-bromo-5-methylisoxazole (0.8 part by weight).

*Example 6.—3-sulfanilamido-4-chloro-5-methylisoxazole*

To a solution of 3-amino-4-chloro-5-methylisoxazole (6 parts by weight) in a mixture of pyridine (4 parts by volume) and benzene (20 parts by volume), there is added p-acetylaminobenzenesulfonyl chloride (11 parts by weight), and the resultant mixture is stirred for 2 hours at 50° C. After cooling, the benzene layer is removed by decantation. To the residue, there is added water and stirring effected to gradually precipitate crystals. The crystals are collected by filtration and heated with aqueous 10% sodium hydroxide solution (40 parts by volume) on a water bath for 1 hour. After cooling, the reaction mixture is acidified with hydrochloric acid. The precipitated crystals are collected by filtration and recrystallized from ethanol to give 3-sulfanilamido-4-chloro-5-methylisoxazole (4.4 parts by volume) as colorless prisms melting at 182 to 184° C. By repetition of the recrystallization, there are obtained pure crystals melting at 187 to 188° C.

*Analysis.*—Calcd. for $C_{10}H_{10}O_3N_3SCl$: C, 41.81; H, 3.49; N, 14.63. Found: C, 42.02; H, 3.57; N, 14.60.

*Example 7.—3-sulfanilamido-4-bromo-5-methylisoxazole*

To a solution of 3-amino-4-bromo-5-methylisoxazole (20 parts by weight) in a mixture of pyridine (15 parts by volume) and benzene (100 parts by volume), there is added p-acetylaminobenzenesulfonyl chloride (25 parts by weight), and the resultant mixture is stirred for 2 hours at 50° C. The precipitated crystals are collected by filtration and hydrolyzed with 10° aqueous sodium hydroxide solution (100 parts by volume) while heating on a water bath. The precipitated crystals are collected by filtration and recrystallized from ethanol to give 3-sulfanilamido-4-bromo-5-methylisoxazole (9.5 parts by weight) as colorless needles melting at 183 to 184° C.

*Analysis.*—Calcd. for $C_{10}H_{10}O_3N_3SBr$: C, 36.11; H, 3.00; N, 12.34. Found: C, 36.37; H, 2.92; N, 12.38.

*Example 8.—3-sulfanilamido-4-iodo-5-methylisoxazole*

To a solution of 3-amino-4-iodo-5-methylisoxazole (2.2 parts by weight) in a mixture of pyridine (1.5 parts by volume) and benzene (20 parts by volume), there is added p-acetylaminobenzenesulfonyl chloride (2.5 parts by weight), and the resultant mixture is stirred for 2 hours at 50° C. The precipitated crystals are collected by filtration and hydrolyzed with 10% aqueous sodium hydroxide solution (10 parts by volume) while heating on a water bath. The precipitated crystals are collected by filtration and recrystallized from ethanol to give 3-sulfanilamido-4-iodo-5-methylisoxazole (1 part by weight) as colorless needles melting at 201 to 202° C. (decomp.) by repetition of the recrystallization, there are obtained pure crystals melting at 209 to 210° C. (decomp.).

*Analysis.*—Calcd. for $C_{10}H_{10}O_3N_3SI$: C, 31.66; H, 2.64; N, 11.11. Found: C, 32.16; H, 2.72; N, 10.71.

While the foregoing examples are directed to simplest and presently-preferred specific embodiments, more complex embodiments wherein the moiety corresponding to R is a lower alkyl higher than methyl may mutatis mutandis be similarly prepared and used.

What is claimed is:
1. Process for producing a prolonged sulfonamide level in the blood of warm blooded animals and combating infections of pathogenic bacteria in said animals which comprises administering 3-sulfanilamido-4-iodo-5-lower alkylisoxazole to said animals.
2. Process for producing a prolonged sulfonamide level in the blood of warm blooded animals and combating infections of pathogenic bacteria in said animals which comprises administering 3-sulfanilamido-4-iodo-5-methylisoxazole to said animals.
3. Process for producing a prolonged sulfonamide level in the blood of human beings and combating infections of pathogenic bacteria in human beings which comprises administering 3-sulfanilamide-4-iodo-5-lower alkylisoxazole to human beings.
4. Process for producing a prolonged sulfonamide level in the blood of human beings and combating infections of pathogenic bacteria in human beings which comprises administering 3-sulfanilamido-4-iodo-5-methylisoxazole to human beings.

References Cited by the Examiner
UNITED STATES PATENTS

| | | | |
|---|---|---|---|
| 2,494,524 | 1/1950 | Sprague | 260—239.9 |
| 2,888,455 | 5/1959 | Kano | 260—239.9 |
| 3,073,839 | 1/1963 | Kano | 260—239.9 |

OTHER REFERENCES

Chem. Abst., vol. 41, pp. 384–385, 1947.
Chem. Abst., vol. 52, p. 20128 (g), 1958.
Chem. Abst., vol. 54, pp. 24656 (g), 1960.

JULIAN S. LEVITT, *Primary Examiner.*

FRANK CACCIAPAGLIA, JR., *Examiner.*